Oct. 9, 1956 G. A. WULFING 2,766,388

MAGNETIC SWITCHING CIRCUITS

Filed Dec. 17, 1953

INVENTOR.
GEORGE A. WULFING
BY S. C. Yuter
ATTORNEY.

2,766,388

MAGNETIC SWITCHING CIRCUITS

George A. Wulfing, Bay Shore, N. Y., assignor to Underwood Corporation, New York, N. Y., a corporation of Delaware Application December 17, 1953, Serial No. 398,780

18 Claims. (Cl. 307—88)

This invention relates to switching circuits, and more particularly to switching circuits which employ magnetic cores.

In the early history of switching circuits, vacuum tubes were used as gating elements to selectively respond to a plurality of signals by passing certain of the signals. Vacuum tubes, however, have been replaced as gating elements in numerous applications by clusters of crystal diodes which require less space and do not dissipate heat.

Different forms of these switching circuits are known as buffers ("or" gates), gates ("and" gates), or inhibitory gates. A buffer functions to pass an output signal if an input signal is received via any of the input terminals. The gate operates to pass an output signal only if input signals are coincidentally received via all of the input terminals. The inhibitory gate will pass a signal present at any signal input terminal unless a signal is present at the inhibitory terminal.

One of the disadvantages of employing crystal diodes as switching elements in switching circuits is the susceptibility of failure of the crystal diodes which are used as switching elements.

Accordingly, an object of the invention is to provide an improved switching circuit.

Another object of the invention is to provide a switching circuit which requires a minimum number of components.

A further object of the invention is to provide an inexpensive and compact switching circuit.

A still further object of the invention is to provide switching circuits of high reliability by avoiding the use of crystal diodes and vacuum tubes as switching elements.

To accomplish the foregoing objects the invention makes use of magnetic cores having rectangular hysteresis-loop properties. Cores having these properties are capable of being rapidly switched from one of two possible conditions of magnetization to the other by a magnetizing force exerted by associated electrical windings. These cores, additionally, are capable of remaining in their last assumed magnetic condition after the force which caused the condition has subsided.

In general, each embodiment of the invention comprises a single magnetic core which has rectangular hysteresis-loop properties. Associated with this core are a number of windings which receive the input signals which are fed to the switching circuit. A clock pulse winding is employed to control the passing of a signal through the switching circuit to an output terminal. The manner in which the windings are connected to each other or to external signal sources determines (as will be shown) whether the circuit functions as a buffer, "and" gate, or inhibitory gate.

A feature of the invention is a basic magnetic unit comprising the magnetic core and associated windings. This unit is an electrical component which is capable of being mass produced and which depends only upon how its windings are connected in the circuit in order to perform as one of the aforementioned switching circuits.

An advantage of the invention is that switched signals are retimed and reshaped by the clock pulses.

The invention also possesses all of the advantages inherent in magnetic core devices such as reliability, stability and high efficiency. Additionally the invention permits important reductions in initial and maintenance costs as a result of the simplicity of construction.

Several forms of this invention have been described in connection with a magnetic bi-stable device which is shown and claimed in the copending application of George A. Wulfing, Serial No. 397,940, filed December 14, 1953, and assigned to the same assignee.

Other objects, features and advantages of the invention will be pointed out in the following description and claims and illustrated in the accompanying drawings which disclose by way of example the principle of the invention and the best modes which have been contemplated of applying that principle.

In the drawings like components are identified by the same reference character:

Figure 1:
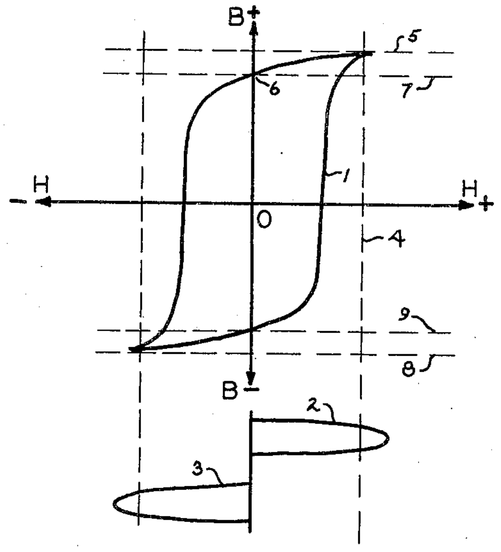
Fig. 1 is a graph showing a curve which illustrates a hysteresis characteristic of a magnetic core made of a preferred material.
Figure 2:
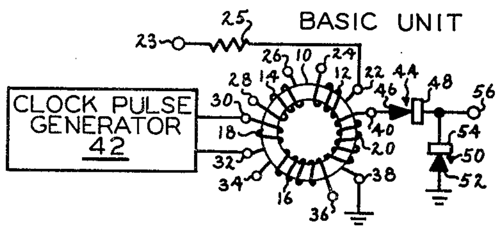
Fig. 2 is a schematic drawing of the basic magnetic unit.

Referring now to Fig. 1, a substantially rectangular hysteresis-loop 1 is shown for a toroidal core, for example, core 10 of Fig. 2. This core may be made from one of the nickle-iron alloys which have been subjected to special processes of heat and magnetic treatment to provide the desired characteristics.

On the curve of Fig. 1, both the magnetomotive force (magnetizing force) H and the flux density (density of magnetic lines of force) B are characteristically shown as having two possible directions, positive or negative, which may respectively represent clockwise and counter-clockwise directions in the toroidal core. Directly below the hysteresis loop 1 is shown a positive surge 2 and a negative surge 3 of magnetomotive force such as might result respectively from positive and negative current pulses in given windings on the core.

When a surge of magnetomotive force such as the positive surge 2 exceeds the magnitude shown by the ordinate 4, the core is driven to positive flux saturation as illustrated (idealized) by the abscissa 5. When the positive surge 2 thereafter sudsides to zero magnetomotive force, the flux density B in the core does not return to zero but returns instead to the point 6 on the abscissa 7 due to the high degree of retentivity of the core. The flux thus continues to exist in the positive direction.

It will be noted that the loss of flux density B represented between the abscissae 5 and 7 is relatively small, hence the "residual" magnetism (point zero to point 6) is a high percentage of the magnetism at core saturation. Additional sequential postiive surges of magnetomotive force will therefore function only to change the flux density levels in the core between the abscissae 5 and 7.

However, if a magnetomotive surge such as the negative surge 3 occurs, the direction of the flux in the core reverses (or "flips") and the core is brought to negative saturation as illustrated by the abscissa 8. Thereafter the core will relax to the flux density shown by the abscissa 9, and the flux will maintain its negative direction until the core is once again driven to positive flux saturation by a positive magnetomotive surge of sufficient magnitude.

Thus a magnetomotive force of any magnitude applied in the same direction as the existing residual flux has little effect on the core whereas a magnetomotive force of requisite magnitude applied in the opposite direction causes a large flux change and causes the residual flux direction to be flipped to this opposite direction.

Throughout the discussion to follow it will be assumed that all input pulses are standardized to a substantially constant amplitude.

Fig. 2 shows the basic unit of the invention which utilizes a core 10 made from a material having rectangular hysteresis-loop properties.

The core 10 has wound thereon the windings 12, 14, 16, 18 and 20. The winding 12 which is connected to the terminals 22 and 24 is wound on the core 10 in such a manner that a positive pulse received via the terminal 22 will cause a positive magnetomotive force to be exerted on the core 10.

The winding 14 is connected to the terminals 26 and 28. The direction of the turns of the winding 14 is such that positive pulses received via the terminal 26 will cause a positive magnetomotive force to be exerted upon the core 10. The winding 18 (also known as a transfer winding) which is coupled to the terminals 30 and 32 is wound upon the core 10 in such a manner that a positive pulse received via the terminal 30 will cause a negative magnetomotive force to be exerted upon the core 10.

The winding 16 connecting the terminals 34 and 36 together is wound so that a positive pulse received via the terminal 34 will cause a positive magnetomotive force to be exerted upon the core 10 and a positive pulse received via the terminal 36 will cause a negative magnetomotive force to be exerted upon the core 10.

The remaining winding, namely, the output winding 20, functions to respond to changes in flux magnitude and direction in the core 10 by producing output pulses of desired magnitude. When the flux direction in the core 10 changes from positive to negative, the output winding 20 generates a positive output signal at the terminal 40 in accordance with the rate of change of flux. When the direction of the flux in the core 10 changes from negative to positive, the output winding 20 functions to generate a negative output signal at the terminal 40. The magnitude of the signal which is generated when the flux density in the core 10 changes between the residual and saturation values in a given direction is small and is disregarded.

It will be assumed in the description which follows that the pulses of the input signals fed to the windings 12, 14 and 16 are each of a predetermined minimum magnitude and constant duration. The input pulses therefore have a determinable pulse period. Stated otherwise, the period of time which elapses between the beginning of one pulse and the time at which the next successive pulse can occur is maintained at a predetermined constant.

Each of the windings 12 and 14 is designed to be capable of generating one half of the magnetomotive force which is necessary to drive the core 10 to positive flux saturation in accordance with the magnitude of such input signals. The winding 16 has sufficient turns to be capable of driving the core 10 to flux saturation in a determinable direction in accordance with which of the terminals 34 or 36 receives an input signal.

Also shown in Fig. 2 are the clock pulse generator 42, the resistor 25 and the crystal diodes 44 and 50 which, although not necessarily considered as being a part of the basic magnetic unit, are common to each of the forms of the switching circuits which will hereinafter be described.

The clock pulse generator 42 is coupled to the terminals 30 and 32 to provide a constant frequency signal which generates negative magnetomotive surges in the winding 18. The clock pulse generator 42 can be any of the square-wave or trapezoidal pulse generators well known to those skilled in the art. Pulse shapes other than square-wave or trapezoidal may also be used. The pulses generated by the clock pulse generator 42 are of the same pulse period as the input pulses which are fed to the windings 12, 14 and 16 but, however, are so phased as to lag the times at which input pulses can occur by a predetermined period of time which is less than one pulse period.

The resistor 25 which couples the input terminal 23 to the terminal 22 is shown in each of the forms of the invention which will hereinafter be described. Other resistors performing a function similar to that of the resistor 25 are additionally used in the other embodiments of the invention, but are not shown in Fig. 2 as they are connected to different terminals in the different embodiments of the invention.

The resistor 25 functions to maintain a substantially constant current in its associated winding (here the winding 12) when a voltage pulse of constant magnitude is fed to the input terminal 23. The resistance of the resistor 25 is in series with the impedance of the winding 12. Because of resistor 25, fluctuations in the impedance of the winding 12 (due to changes of the flux conditions in the core 10) cause a relatively small change of the total impedance in the path of signals fed to the input terminal 23. Thus, the current in the winding 12 can be substantially controlled by the magnitude of the input signal. The resistor 25 may be omitted when the signal source which is connected to the input terminal 23 is choosen to be a constant current device. The resistor 25 may also be used to isolate the signal source from the winding 12.

The terminal 40 of the winding 20 is, in each embodiment of the invention, connected to the anode 46 of the crystal diode 44 and the terminal 38 is grounded. The cathode 48 of the crystal diode 44 is connected to the output terminal 56. The crystal diode 44, due to its rectifying action, functions to permit only the positive pulses which are generated in the winding 20 to be transmitted to the output terminal 56. The crystal diode 44 disconnects the load while the core 10 is being positively saturated.

The crystal diode 50 connects the output terminal 56 to ground. The anode 52 and the cathode 54 of the crystal diode 50 are respectively connected to ground and to the output terminal 56. The crystal diode 50 functions to prevent the potential level of the output terminal 56 from becoming negative in which event the crystal diode 44 might conduct. The combined effects of the crystal diodes 44 and 50, therefore, are to prevent the transmission of signals from the output terminal 56 back into the output winding 20.

Figure 3:
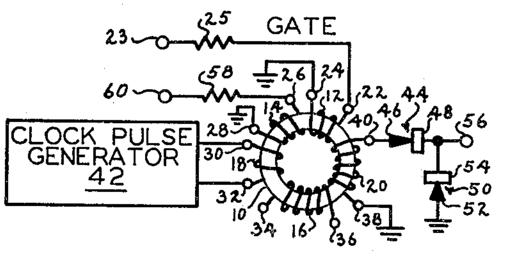
Fig. 3 is a schematic drawing of a magnetic gate which includes the basic magnetic unit.

In Fig. 3, the basic unit is shown connected so as to function as a gate. The terminal 26 of the winding 14 is coupled via the resistor 58 (whose function is the same as that of the resistor 25) to the input terminal 60. The terminal 28 of the winding 14 is connected to ground. The terminal 24 of the winding 12 is grounded and the output winding 20 is connected as previously described.

In order to conform with the function previously described for a gate, the magnetic gate must pass a signal only when there is a coincidence of signals applied to the windings 12 and 14.

As previously noted, each of the windings 12 and 14 are capable of supplying one half of the magnetomotive force necessary to saturate the core 10 with positive flux. Therefore, it follows that when pulses of the requisite magnitude are fed to the windings 12 and 14 via the terminals 23 and 60, respectively, sufficient magnetomotive force will be generated so as to positively saturate the core 10. When the magnetomotive surges discontinue, the core 10 will relax to a residual flux density which is a high percentage of the flux density at saturation in accordance with the curve shown in Fig. 1.

However, if a pulse is fed to only one of the windings, for example, the winding 12 of Fig. 3, the resulting magnetomotive force will cause only a relatively minor change in flux, and on termination of the pulse the flux will relax to substantially the value it had before the occurrence of the pulse.

After the receipt of simultaneous pulses on the windings 12 and 14, the core 10 continues to reside in the positive flux direction until the occurrence of the next successive pulse fed to the winding 18 by the clock pulse generator 42.

It should again be noted that pulses from the clock pulse generator 42 occur less than one pulse period following the receipt of the input pulses by the input terminals 23 and 60. As a result of the occurrence of the clock pulse, the winding 18 generates sufficient magnetomotive force to negatively saturate the core 10 and flip the direction of the flux in the core 10 from positive to negative. The resulting positive pulse which is generated in the winding 20 is transmitted via the crystal diode 44 to the output terminal 56. The crystal diode 44 blocks any negative pulse which may have been generated in the aforementioned process.

It will be noted that, due to a coincidence of input pulses fed to the input terminals 23 and 60, a pulse is transmitted from the output terminal 56. Thus the circuit shown in Fig. 3 functions as a gate. Output pulses which occur as previously described are each delayed for a determinable period of time which is less than one pulse period following the simultaneous occurrence of the input pulses at the input terminals 23 and 60.

Figure 4:
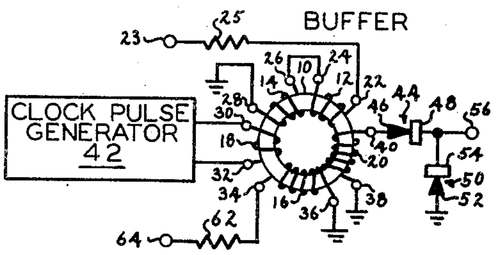
Fig. 4 is a schematic drawing of a magnetic buffer which includes the basic magnetic unit.

Fig. 4 illustrates how the basic unit previously described may be connected to sources of input pulses so as to function as a buffer. It will be noted that the terminal 24 of the winding 12 is connected to the terminal 26 of the winding 14 whose terminal 28 is grounded. Thus a series path is presented from the input terminal 23 to ground via the windings 12 and 14. The terminal 34 of the winding 16 is coupled via the resistor 62 (whose function is the same as that of the resistor 25) to the input terminal 64. The terminal 36 of the winding 16 is grounded.

Since, as already noted, the windings 12 and 14 can each contribute one half of the magnetomotive force necessary to drive the core 10 to positive flux saturation, it follows that a pulse fed to the input terminal 23 will cause the core 10 to be positively saturated. The winding 16 is capable of driving the core 10 to positive flux saturation if a positive pulse is received via the winding 34. Therefore, it follows that if a pulse is received via either of the input terminals 23 or 64 the core 10 becomes positively saturated with flux, thus establishing a condition whereby the next negative magnetomotive surge occurring in the winding 18 (as a result of a pulse received from the clock pulse generator 42) will cause a positive pulse to be generated in the winding 20.

The pulses generated by the clock pulse generator 42 lag the input pulses fed to the input terminals 23 and 64, so that the positive pulse generated in the winding 20 occurs a determinable period of time which is less than a pulse period after the occurrence of the input pulses at either of the input terminals 23 and 64. The positive pulse which is generated in the winding 20 is transmitted via the crystal diode 44 to the output terminal 56. Again, any negative pulse which may have resulted in the output winding 20 as a result of the previously described process is blocked by the crystal diode 44.

The circuit shown in Fig. 4 thus functions as a buffer since this circuit transmits an output pulse as a result of receiving an input pulse via either of the input terminals 23 or 64.

Figure 5:
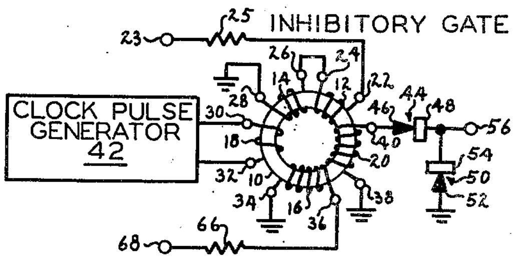
Fig. 5 is a schematic drawing of a magnetic inhibitory gate which includes the basic magnetic unit.

Fig. 5 illustrates how the basic unit is connected to sources of input pulses so as to perform as an inhibitory gate.

As in the buffer, the terminals 24 and 26 are connected so that the winding 12 and 14 form a part of a series path between the input terminal 23 and the terminal 28 which is grounded. For the inhibitory gate, however, the terminal 36 of the winding 16 is coupled via the resistor 66 (whose function is the same as that of the resistor 25) and the input terminal 68 to a source of input pulses and the terminal 34 is grounded so that when a pulse is transmitted to the input terminal 68, the winding 16 generates a negative magnetomotive surge.

Although the combined effects of the windings 12 and 14, when pulsed, are sufficient to drive the core 10 to positive flux saturation, the winding 16 is now connected so as to yield an opposing magnetomotive force. The magnetomotive force generated in the windings 12 and 14 when algebraically added to the magnetomotive force generated in the winding 16 yields approximately zero magnetomotive force.

Therefore, it follows that when an input pulse is transmitted to the input terminal 68 the core 10 will not be positively saturated with flux even though an input pulse is simultaneously fed to the input terminal 23. It is only in the absence of an input pulse at the input terminal 68 that a signal fed to the input terminal 23 can cause the core 10 to become positively saturated.

When, under the proper conditions, the core 10 is positively saturated, the next sequential negative magnetomotive surge in the winding 18 due to the signal from the clock pulse generator 42 causes a positive pulse to be generated in the output winding 20. Similarly to the process previously described, the positive output pulse in the winding 20 occurs a determinable period of time which is less than one pulse period following the receipt of an input pulse via the input terminal 23. The positive pulse is fed via the crystal diode 44 to the output terminal 56.

In this manner the circuit shown in Fig. 5 functions as an inhibitory gate such that the presence of a control signal at the input terminal 68 prevents the circuit from passing any signal which it may receive via the input terminal 23.

In conjunction with the above-described switching circuits or with magnetic shift registers, as well as with many other circuits, it may be desirable to use switching circuits in which substantially no time elapses between the receipt of input signals and the transmission of output signals. The devices shown in Figs. 2, 3, 4 and 5 may be modified as next described and, as modified, will function to transmit an output signal at substantially the same time as the receipt of the proper combination of input signals.

Figure 6:
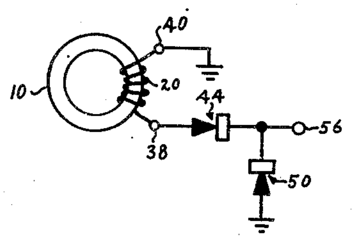
Fig. 6 illustrates how the circuits shown in Figs. 2, 3, 4 and 5 may be modified to provide other embodiments of the switching circuits.

Referring now to Fig. 6, the connections of the terminals 38 and 40 of output winding 20 are reversed so that the terminal 40 is grounded and the terminal 38 is coupled via the crystal diode 44 to the output terminal 56. The remaining windings (shown shown) remain as shown in Fig. 2.

Each of the circuits shown in Figs. 3, 4 and 5 are thus modified to the extent of reversing the connections of their output windings 20 and, as modified, function to transmit a positive pulse when the flux direction in the core 10 is flipped from negative to positive. Since this type of flipping occurs when the proper combination of input signals are received (instead of upon the receipt of a clock pulse), an output pulse is transmitted at substantially the same time as when the input pulses are received. The clock pulse generator (not shown) wil restore the negative flux direction in the core 10 within a pulse period.

Thus, in other embodiments of the invention magnetic buffers, gates, and inhibitory gates are provided in which substantially no time elapses between the receipt of input pulses and the transmission of output pulses.

It has thus been described how the basic unit illustrated in Fig. 2 may be connected to sources of input pulses in various ways such that the basic unit may function as either a gate, buffer or inhibitory gate. As shown, the circuits possess all of the advantages inherent in magnetic core devices. The circuits are further simple and compact and are capable of retiming and reshaping the signals which are passed.

While only a few representative embodiments of the invention disclosed herein have been outlined in detail there will be obvious to those skilled in the art many modifications and variations accomplishing the foregoing objects and realizing any or all of the advantages but which do not depart essentially from the spirit of the invention.

What is claimed is:

1. A magnetic switching circuit which responds to first and second sources of input pulses, each of said input pulses having a predetermined pulse period, and to a clock pulse generator, said magnetic switching circuit comprising a magnetic core, a setting winding responsive to said clock pulse generator for setting said magnetic core in a given condition, first and second input windings coupled respectively to said first and second sources of input pulses, said input windings being responsive to predetermined combinations of the input pulses for setting said magnetic core in an opposite condition, said setting winding being operable to restore the given condition within a period not more than said predetermined pulse period.

2. A magnetic switching circuit which responds to first and second sources of input pulses and to a clock pulse generator, said magnetic switching circuit comprising a magnetic core, a setting winding responsive to said clock pulse generator for setting said magnetic core in a given condition, first and second input windings, and coupling means for coupling said first and second sources of input pulses to said first and second input windings respectively, said input windings being responsive to predetermined combinations of the input pulses for setting said magnetic core in an opposite condition, said setting winding being operable to restore the given condition within a period not more than said predetermined pulse period.

3. A magnetic switching circuit which responds to first and second sources of input pulses having a predetermined pulse period and to a clock pulse generator, said magnetic switching circuit comprising a magnetic core having rectangular hysteresis-loop properties, a setting winding responsive to said clock pulse generator for setting said magnetic core in a given condition, first and second input windings, and coupling means for coupling said first and second sources of input pulses to said first and second input windings respectively, said input windings being responsive to predetermined combinations of the input pulses for setting said magnetic core in an opposite condition, said setting winding being operable to restore the given condition within a portion of said predetermined pulse period.

4. A magnetic switching circuit which responds to a plurality of sources of input pulses and to a clock pulse generator, said magnetic switching circuit comprising a magnetic core having rectangular hysteresis-loop properties, a setting winding responsive to said clock pulse generator for setting said magnetic core in a given condition, a plurality of input windings, and coupling means for coupling each of said sources of input pulses to one of said input windings, said input windings being responsive to predetermined combinations of the input pulses for setting said magnetic core in an opposite condition, said setting winding being operable to restore the given condition within a period not more than said predetermined pulse period.

5. A magnetic switching circuit which responds to first and second sources of input pulses which have predetermined pulse periods comprising a clock pulse generator; a magnetic unit including a magnetic core having rectangular hysteresis-loop properties, a setting winding associated with said magnetic core and being responsive to said clock pulse generator for setting said magnetic core in a given condition, a number $n$ of input windings associated with said magnetic core, each of said input windings being responsive to certain of the input pulses for supplying $1/n$ of the magnetomotive force required to set said magnetic core in an opposite condition, at least one control winding having two terminals and being responsive to input pulses received via one of said terminals, said control winding supplying sufficient magnetomotive force to set said magnetic core in one of the conditions in accordance with which of said terminals the input pulses are received by, an output means responsive to the setting of said magnetic core in one of the conditions for transmitting a signal; and coupling means selectively coupling said setting and input windings and said control winding together.

6. A magnetic switching unit for responding to first and second sources of input pulses having a predetermined pulse period and to a source of setting pulses comprising a magnetic core, a setting winding responsive to said setting pulses for setting said magnetic core in a given condition, first and second input windings each connected to one of said first and second sources of input pulses and responsive to predetermined combinations of input pulses for setting said magnetic core in an opposite condition, said setting winding being operable to restore the given condition within a period not more than said predetermined pulse period, and an output winding responsive to a change in the condition of said magnetic core to produce an output pulse indicative of the occurrence of said predetermined combination of input pulses.

7. A magnetic gate for responding to sources of input pulses having a predetermined pulse period comprising a magnetic core having rectangular hysteresis-loop properties, a setting winding for setting said magnetic core in a given condition, a plurality of input windings responsive to predetermined combinations of input pulses for setting said magnetic core in an opposite condition, said setting means being operable to restore the given condition within a portion of said predetermined pulse period, and an output winding responsive to a change in the condition of said magnetic core to produce an output pulse indicative of the occurrence of said predetermined combination of input pulses.

8. A magnetic switching unit responsive to input pulses from at least two input pulse sources and to setting pulses from a pulse generator, said magnetic switching unit comprising a magnetic core having rectangular hysteresis-loop properties, a setting winding associated with said magnetic core for being responsive to said pulse generator to set said magnetic core in a given condition, a number $n$ of input windings associated with said magnetic core, each of said input windings being responsive to certain of the input pulses for supplying $1/n$ of the magnetomotive force required to set said magnetic core in an opposite magnetic condition, at least one control winding having two terminals and being responsive to input pulses received via one of said terminals, said control winding supplying sufficient magnetomotive force to set said magnetic core in one of the conditions in accordance with which of said terminals the input pulses are received by, and an output means responsive to the setting of said magnetic core in one of the conditions for transmitting a signal indicative of the occurrence of predetermined combinations of input pulses.

9. A buffer which responds to first and second sources of input pulses having a predetermined pulse period and to a pulse generator, said buffer comprising a magnetic core having rectangular hysteresis-loop properties, a setting winding associated with said magnetic core being responsive to said pulse generator for setting said magnetic core in a given condition, a first and second input windings associated with said magnetic core, said first and second input windings being connected respectively to said first and second sources of input pulses and responsive to an input pulse for setting said magnetic core in an opposite condition, said setting winding restoring said given condition in said magnetic core within a portion of said predetermined pulse period, and output means responsive to certain of the changes in the condition of said magnetic core for transmitting an output signal, indicative of the occurrence of an input pulse at one of said input windings.

10. A magnetic buffer circuit which responds to one input pulse from one of a plurality of sources of input pulses, each of said input pulses having a predetermined pulse period, said magnetic buffer circuit comprising a magnetic core having rectangular hysteresis-loop properties, a transfer pulse generator, a transfer winding associated with said magnetic core for being responsive to said transfer pulse generator to set said magnetic core in a given condition, a plurality of input windings associated with said magnetic core, each of said input windings being connected to one of said plurality of input pulse sources, each of said input windings being separately responsive to an input pulse for setting said magnetic core in an opposite condition, said transfer winding restoring said given condition in said magnetic core within a portion of said predetermined pulse period, and output means responsive to certain of the changes in the condition of said magnetic core for transmitting an output signal to indicate the receipt of an input pulse at any of said input windings.

11. A magnetic gating circuit which responds to at least two sources of input pulses, said input pulses having a predetermined pulse period and to a clock pulse generator, said magnetic gating circuit comprising a magnetic core having rectangular hysteresis-loop properties, a transfer winding associated with said magnetic core for being responsive to said clock pulse generator to set said magnetic core in a given condition, a plurality of input windings associated with said magnetic core, said input windings being cooperatively responsive to the simultaneous presence of an input pulse from each of said sources of input pulses for setting said magnetic core in an opposite condition, said transfer winding restoring said given condition in said magnetic core within a portion of said predetermined pulse period, and output means responsive to certain of the changes in the condition of said magnetic core for transmitting an output signal corresponding to the simultaneous occurrence of input pulses at each of said input windings.

12. A magnetic gating circuit which responds to a plurality of sources of input pulses, each of said pulses having a predetermined pulse period, said magnetic gating circuit comprising a magnetic core having rectangular hysteresis-loop properties, a pulse generator, a transfer winding associated with said magnetic core for being responsive to said pulse generator to set said magnetic core in a given condition, a plurality of input windings associated with said magnetic core, each of said input windings being connected to one of said plurality of sources of input pulses, said input windings being cooperatively responsive to the simultaneous occurrence of input pulses for setting said magnetic core in an opposite condition, said transfer winding restoring said given condition in said magnetic core within a portion of said predetermined pulse period, and output means responsive to certain of the changes in the condition of said magnetic core for transmitting an output signal to indicate the simultaneous appearance of an input pulse at each of said input windings.

13. An inhibitory gate which responds to two sources of input pulses, said input pulses having a predetermined pulse period and to a pulse generator, said inhibitory gate comprising a magnetic core having rectangular hysteresis-loop properties, a transfer winding associated with said magnetic core for being responsive to said pulse generator to set said magnetic core in a given condition, an input winding associated with said magnetic core connected to one of said sources of input pulses for being responsive to the input pulses for setting said magnetic core in an opposite condition, an inhibiting winding connected to the other of said sources of input pulses and responsive to the input pulses for preventing said magnetic core from being set in the opposite condition, said transfer winding restoring said given condition in said magnetic core within a time equal to a portion of said predetermined pulse period after said magnetic core is set in the opposite condition, and output means responsive to certain of the changes in the condition of said magnetic core for transmitting an output signal to indicate the presence of an input pulse at said input winding and the absence of an input pulse at said inhibiting winding.

14. An inhibitory gate which responds to first and second sources of input pulses having a predetermined pulse period, said inhibitory gate comprising a magnetic core having rectangular hysteresis-loop properties, a pulse generator, a transfer winding associated with said magnetic core for being responsive to said pulse generator to set said magnetic core in a given condition, an input winding associated with said magnetic core and connected to said first source of input pulses for setting said magnetic core in an opposite condition, an inhibiting winding connected to said second source of input pulses for preventing said magnetic core from being set in the opposite condition, said transfer winding restoring said given condition in said magnetic core within a time equal to a portion of said predetermined pulse period after said magnetic core is set in the opposite condition, and output means responsive to certain of the changes in the condition of said magnetic core for transmitting an output signal which corresponds to the presence of an input pulse at said input winding simultaneously with the absence of an input pulse at said inhibiting winding.

15. A magnetic gate which responds to a plurality of sources of input pulses, each of said input pulses having a predetermined pulse period, said magnetic gate comprising a magnetic core having rectangular hysteresis-loop properties, a pulse generator, a transfer winding associated with said magnetic core for being responsive to said pulse generator to set said magnetic core in a given condition, a plurality of input windings associated with said magnetic core, each of said input windings being connected to one of said sources of input pulses and being cooperatively responsive to the simultaneous appearance of an input pulse at each of said input windings for setting said magnetic core in an opposite condition, said transfer winding restoring said given condition in said magnetic core within a portion of said predetermined pulse period, and output means responsive to the change in the condition of said magnetic core from the opposite condition to the given condition for transmitting an output signal representing the simultaneous occurrence of an input pulse at each of said input windings.

16. A magnetic gate which responds to sources of input pulses having a predetermined pulse period, said magnetic gate comprising a a magnetic core having rectangular hysteresis-loop properties, a clock pulse generator, a transfer winding associated with said magnetic core for being responsive to said clock pulse generator to set said magnetic core in a given condition, a plurality of input windings associated with said magnetic core, each of said input windings being connected to one of said sources of input pulses and being cooperatively responsive to input pulses for setting said magnetic core in an opposite condition, said transfer winding restoring said given condition in said magnetic core within a portion of said predetermined pulse period, and output means responsive to the change in the condition of said magnetic core from the given condition to the opposite condition for transmitting an output signal indicating the occurrence of input pulses at all of said input windings.

17. A magnetic inhibitory gate which responds to sources of input pulses having a predetermined pulse period, said magnetic inhibitory gate comprising a magnetic core having rectangular hysteresis-loop properties, a clock pulse generator, a transfer winding associated with said magnetic core for being responsive to said clock pulse generator to set said magnetic core in a given condition, a first input winding associated with said magnetic core for being responsive to certain of the input pulses for setting said magnetic core in an opposite condition, a second input winding responsive to other of the input pulses for preventing said magnetic core from being set in the opposite condition, said transfer winding restoring said given condition in said magnetic core within a time equal to a portion of said predetermined pulse period after said magnetic core is set in the opposite condition, and output means responsive to the change in the condition of said magnetic core from the opposite condition to the given condition for transmitting an output signal.

18. A magnetic inhibitory gate which responds to sources of input pulses having a predetermined pulse period, said magnetic inhibitory gate comprising a magnetic core having rectangular hysteresis-loop properties, a clock pulse generator, a transfer winding associated with said magnetic core for being responsive to said clock pulse generator to set said magnetic core in a given condition, an input winding associated with said magnetic core for being responsive to certain of the input pulses for setting said magnetic core in an opposite condition, an inhibiting winding responsive to other of the input pulses for preventing said magnetic core from being set in the opposite condition, said transfer winding restoring said given condition in said magnetic core within a time equal to a portion of said predetermined pulse period after said magnetic core is set in the opposite condition, and output means responsive to the change in the condition of said magnetic core from the given condition to the opposite condition for transmitting an output signal.

References Cited in the file of this patent

UNITED STATES PATENTS

| | | |
|---|---|---|
| 2,574,438 | Rossi et al. | Nov. 6, 1951 |
| 2,652,501 | Wilson | Sept. 15, 1953 |
| 2,654,080 | Browne | Sept. 29, 1953 |
| 2,680,891 | Booth | June 8, 1954 |

OTHER REFERENCES

Publication: Progress Report (2) on the EDVAC; vol. II, published June 30, 1946, Moore School of Electrical Engineering, U. of Pa., Phila., Pa.; especially par. 4.2.12, etc., and Figs. 17*a*, *b*, and *c*.